(12) United States Patent
Sfar

(10) Patent No.: US 9,185,731 B2
(45) Date of Patent: Nov. 10, 2015

(54) SELF-CONFIGURATION OF AN E-NODE-B

(75) Inventor: Safouane Sfar, Nuremberg (DE)

(73) Assignee: ST-ERICSSON SA, Plan-les-Ouates (CH)

( * ) Notice: Subject to any disclaimer, the term of this patent is extended or adjusted under 35 U.S.C. 154(b) by 219 days.

(21) Appl. No.: 13/988,572

(22) PCT Filed: Nov. 18, 2011

(86) PCT No.: PCT/EP2011/070501
§ 371 (c)(1),
(2), (4) Date: Jul. 8, 2013

(87) PCT Pub. No.: WO2012/069391
PCT Pub. Date: May 31, 2012

(65) Prior Publication Data
US 2013/0286898 A1    Oct. 31, 2013

Related U.S. Application Data

(60) Provisional application No. 61/423,415, filed on Dec. 15, 2010.

(30) Foreign Application Priority Data

Nov. 22, 2010   (EP) .................................... 10306281

(51) Int. Cl.
| | | |
|---|---|---|
| H04L 12/28 | (2006.01) |
| H04W 76/02 | (2009.01) |
| H04W 24/02 | (2009.01) |
| H04W 84/04 | (2009.01) |

(52) U.S. Cl.
CPC .............. *H04W 76/02* (2013.01); *H04W 24/02* (2013.01); *H04W 84/045* (2013.01)

(58) Field of Classification Search
CPC ..... H04W 76/00; H04W 76/02; H04W 24/02; H04W 84/00; H04W 84/02; H04W 84/04; H04W 84/045
See application file for complete search history.

(56) References Cited

U.S. PATENT DOCUMENTS 8,369,253 B2 * 2/2013 Faccin et al. ............... 370/310.2
8,649,291 B2 * 2/2014 Wang et al. ................... 370/254
(Continued)

FOREIGN PATENT DOCUMENTS

| EP | 2 112 846 A1 | 10/2009 |
|---|---|---|
| EP | 2 175 676 A1 | 4/2010 |
| WO | 2009/096835 A1 | 8/2009 |

OTHER PUBLICATIONS

International Search Report issued in corresponding International application No. PCT/EP2011/070501, date of mailing Jan. 16, 2012.
(Continued)

*Primary Examiner* — Anh Ngoc Nguyen
(74) *Attorney, Agent, or Firm* — Patent Portfolio Builders PLLC

(57) ABSTRACT

A method of configuration of an e-Node B device, on order to integrate the e-Node B device in a telecommunication network, comprising the following steps, performed by the e-Node B device: —entering a user equipment mode, —establishing a communication link with the telecommunication network, —receiving configuration data, —self-configuring using the received data, and —entering an operational state, wherein the establishment of the communication link comprises transmitting a data element indicating that the establishment of the communication originates from an e-Node B behaving as a user equipment.

20 Claims, 3 Drawing Sheets

(56) References Cited

U.S. PATENT DOCUMENTS

2010/0075678 A1* 3/2010 Akman et al. ............... 455/436
2010/0227603 A1   9/2010 Gupta et al.
2010/0240382 A1* 9/2010 Sampath et al. ............ 455/450

OTHER PUBLICATIONS

Honglin, Hu et al., "Self-Configuration and Self-Optimization for LTE Networks," IEEE Communications Magazine, IEEE Service Center, Piscataway, USA, vol. 47, No. 2, Feb. 1, 2010, pp. 94-100, XP011300898.

"3rd Generation Partnership Project; Technical Specification Group Core Network and Terminals; Non-Access Stratum (NAS) Protocol for Evolved Packet System (EPS); Stage 3 (Release 9)," 3GPP Standard, 3GPP TS 24.301, 3rd Generation Partnership Project (3GPP), Mobile Competence Centre; 650, Route Des Lucioles, F-06921 Sophia-Antipolis Cedex, France, No. V9.0.0, Sep. 1, 2009, pp. 1-1272, XP050365242.

* cited by examiner

SELF-CONFIGURATION OF AN E-NODE-B

TECHNICAL FIELD

The present invention relates to the installation of e-Node Bs in a Long Term Evolution (LIE) network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The 3GPP Release 8 introduced the LTE (Long Term Evolution) that provides core network entities for supporting real-time voice and multimedia IP services.

The self-configuration is defined as the process wherein the newly deployed e-Node Bs are configured by automatic installation procedures to get basic parameters and download necessary Software from the network.

According to the 3GPP specifications and definition of experts, in a first step, the e-Node B gets an Internet Protocol (IP) address for communicating over the network. Then the e-Node B triggers a procedure in order to be associated with an access gateway. After that, the e-Node B downloads the required software and the operational parameters and sets up its interfaces with the network. Finally, the e-Node B configures the coverage and traffic capacity according to the downloaded information, and then enters in the operational state.

With the increase of the use of e-Node Bs, there is a need for providing enhanced installation procedures in order to deploy efficiently the e-Node Bs in existing networks.

SUMMARY OF THE INVENTION

The present invention provides a method enabling self-configuration of e-Node Bs to be integrated to a network.

To that end there is provided, according to a first aspect of the invention, a method of configuration of an e-Node B device, in order to integrate the e-Node B device in a telecommunication network, comprising the following steps, performed by the e-Node B device:
  entering a user equipment mode, wherein the e-Node B device behaves like a user equipment of the telecommunication network,
  establishing a communication link with a management entity of the telecommunication network,
  receiving configuration data for a self-configuration of the e-Node B in order to enter an operational mode from the management entity of the telecommunication network, through the communication link,
  self-configuring using the received data in order to provide a communication coverage area in the telecommunication network, and
  entering an operational state wherein it offers to communication terminals of the telecommunication network a coverage area,
wherein the establishment of the communication link comprises transmitting a data element indicating that the establishment of the communication originates from an e-Node B behaving as a user equipment.

Thus, the e-Node B can perform itself its configuration without a dedicated backhaul to be needed.

Since the communication link establishment is identified as originating from an e-Node B, the management entity of the network can prepare the transfer of the required data (Softaware, parameters . . . ). The management entity can also give priority to the communication from the e-Node B in order to accelerate its integration in the network. Thus the configuration process is optimized.

This invention can be applied to the high layers of user equipment and operator network elements.

According to other aspects of the invention, there is also provided:
  a computer program comprising instructions for executing a method according to the first aspect when the program is executed by a processor;
  a computer program product for storing the computer program; and
  devices for implementing a method according the first aspect.

These objects provide at least the same advantages as those associated to the method.

Other advantages are obtained by additional features which are recited in the dependent claims attached hereto.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF THE INVENTION

Figure 1:
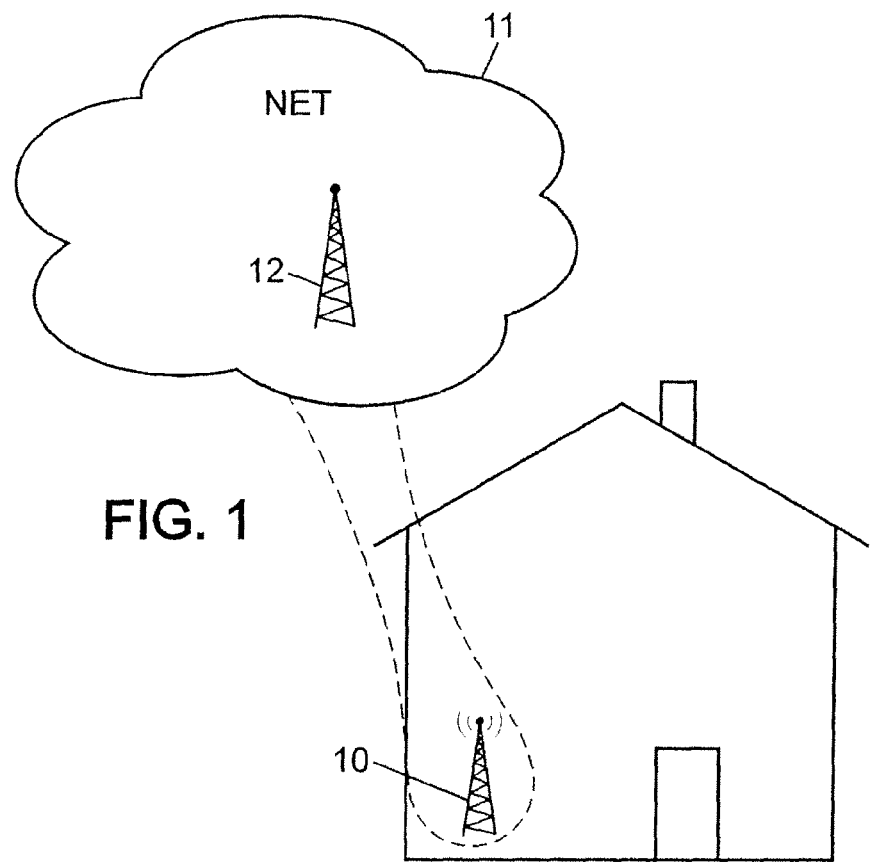
FIG. 1 is a schematic illustration of a context of implementation of embodiments of the invention.

FIG. 1 illustrates a context of implementation of embodiments of the invention. An e-Node B 10 is to be integrated in a communication network 11. The e-Node B is to provide an additional coverage area or an enhanced coverage area to the network. However, the e-Node B as to be first configured in order to handle properly the communications over the network. In order to receive configuration parameters, the e-Node B can communicate with a management entity 12 of the network.

The e-Node B starts in UE (User Equipment) mode. In the UE mode the e-Node B behaves like a normal mobile communication device on the network (the person skilled in the art may find indications concerning such a behaviour in documents 24.008, 24.301 and 36.331 of the 3GPP standard specification). It uses the same mechanisms as those used by mobile terminals for communicating over the network. In that mode, the e-Node B does not provide a communication coverage area.

In the UE mode, the e-Node B obtains an IP address and downloads the required software (list of instructions) and the operational parameters using DHCP/BOOTP protocols in order to be configured for acting on the network as coverage area provider.

Once the software and parameters received, the e-Node B sets up its communication interfaces, for example the X2/S1 interfaces.

Then, the e-Node B configures the coverage and traffic capacity according to the downloaded information, and then enters in the operational state.

In the UE mode, the e-Node B communications may be based on the principles used in GSM/UMTS configuration mode between BS/NB (Base Station/Node B) and BSC/RNC (Base Station Controller/Radio Network Controller), such as downloading transmission tables.

In order to make a distinction between the e-Node B when it starts UE mode and a normal UE, the spare bit in the "EPS attach type" (described in section 9.9.3.11 of document TS 24.301 of the 3GPP specification) is used.

Figure 2:
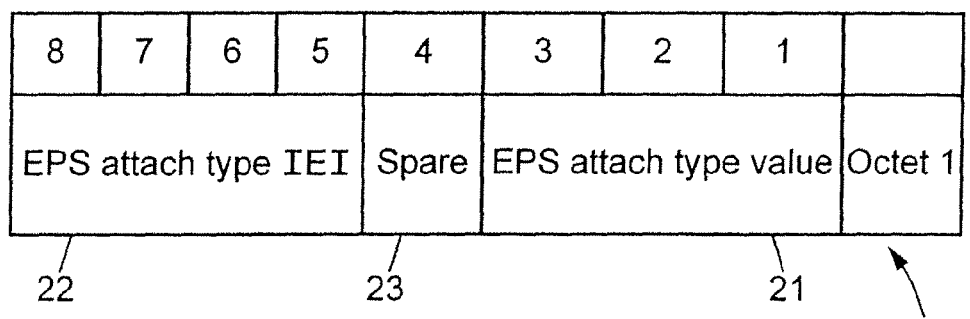
FIG. 2 illustrates an EPS attach type information element.

The EPS attach type information element is illustrated in FIG. 2.

The EPS attach type information element 20 comprises several bit groups, such as the EPS attach type IEI 21 and the EPS attach type value 22. It has also a spare bit 23 that is not used in the prior art. According to embodiments, this bit is used to differentiate the communication requests from normal terminals and e-Node Bs in user equipment mode (for example the spare bit is 1 for an e-Node B and 0 for a terminal or inversely).

For example, when the e-Node B acting as a UE transmits an EPS attach type information element with the spare bit set to 1 (the alternative may also be envisaged), the management entity of the network is informed that the establishment of a communication link is requested by an e-Node B.

Thus, the management entity will handle this communication with a high level of priority (compared to conventional communications of User Equipments), and will trigger the preparation of the data needed by the e-Node B (the software and the other parameters).

Figure 3:
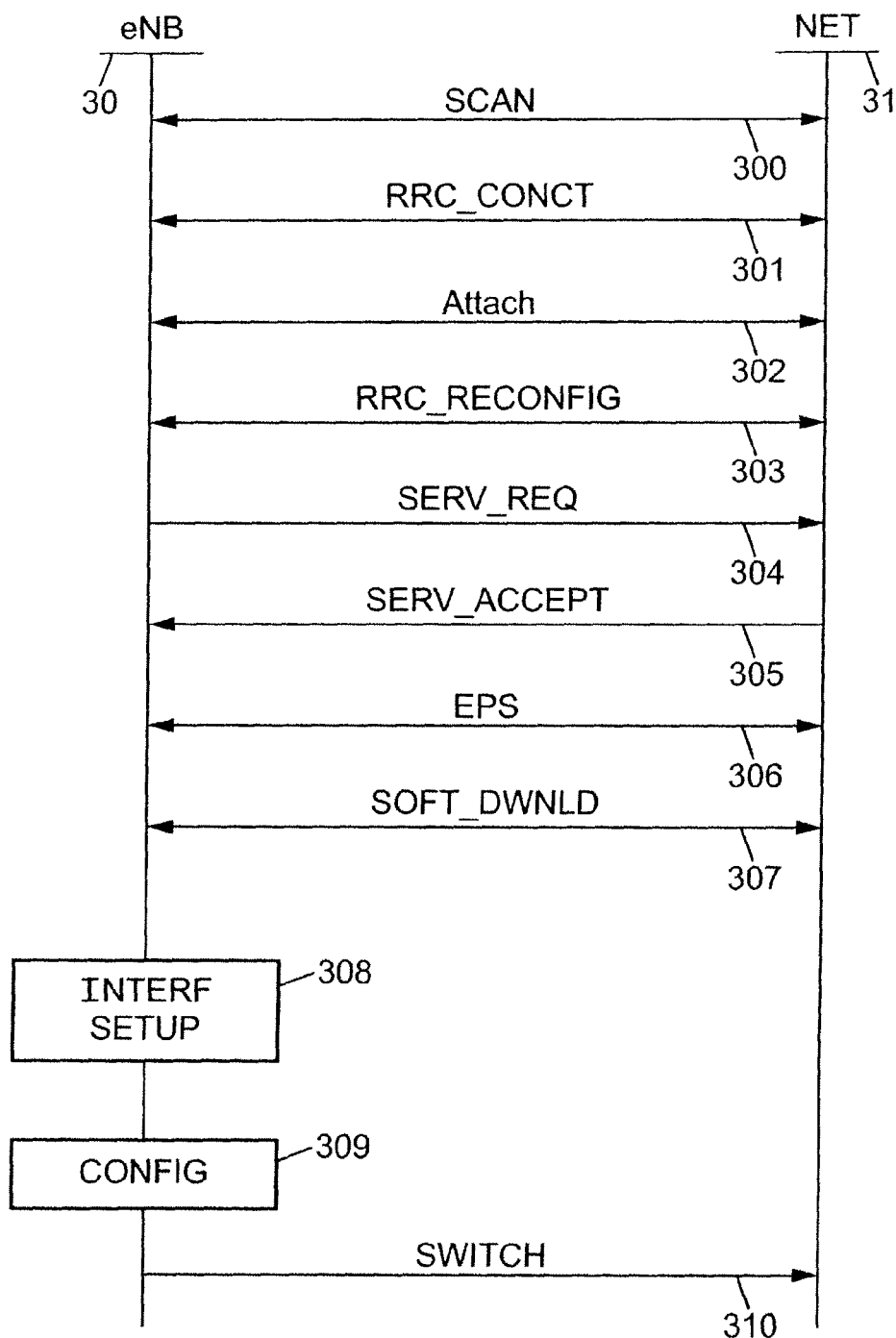
FIG. 3 illustrates the exchanges between an e-Node B and a management entity of a network according to embodiments of the invention.

FIG. 3, illustrates the exchange between an e-Node B 30 to be added and a management entity 31 of the network (for example an already integrated e-Node B of a Mobility Management Entity (MME)).

The e-Node B enters an UE mode and performs a cell scan 300 for searching for available cell and frequencies.

Once a cell is found, the e-Node B performs an RRC Connection Establishment 301. The cause of the RRC connection can be for example "e-Node B configuration" as indicated by the transmission of the EPS attach type information element with the spare bit set to 1 (or 0 alternatively).

The management entity thus recognizes that the connection request originates from an e-Node B that is self-configurating.

The attachment process goes on during a step 302. There is no RRC

Connection Release after the end of the Attach procedure to maintain RRC in CONNECTED mode.

Once the e-Node B is attached, the management entity issues a paging message during the RRC connection reconfiguration 303. Then, the communication between the e-Node B acting as an UE and the management entity switches to a data transfer communication.

The e-Node B then issues a service request 304 for starting the communication, then the management entity issues a service acceptation 305.

The EPS bearer context activation is then performed during a step 306.

Once the context activated, the e-Node B retrieves an IP address on the network and starts the download of the software and the configuration parameters, prepared by the management entity during a step 307.

Once the software and the parameters received. the e-Node B establishes its interfaces with the network, by setting up its X2/S1 interface during step 308. Then, it self-configures in order to be integrated to the network as an e-Node B during step 309.

Once the self-configuration performed, the e-Node B enters an operational mode wherein it does not behave like a UE any longer and behaves like an e-Node B on the network, during a step 310.

FIG. 3 is a general flowchart that summarizes steps performed according to an embodiment.

The e-Node B first enters an UE mode wherein it behaves like a User Equipment of the network during step S400. Then, the e-Node B downloads the parameters needed for its self-configuration during step S401. The e-Node B then self-configures for acting as an e-Node B on the network during step S402. Finally, the e-Node B enters an operational mode wherein it behaves like a normal e-Node B during step S403.

Figure 4:
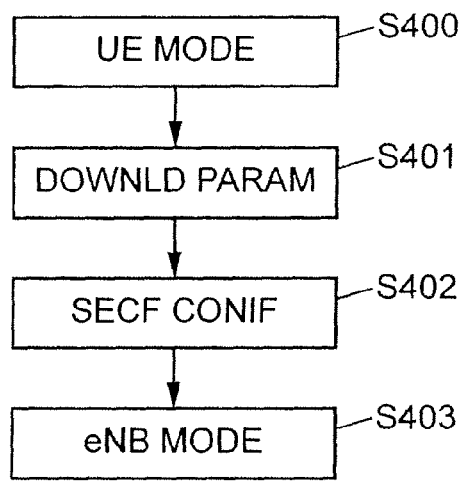
FIG. 4 is a flowchart illustrating steps of a method according to embodiments of the invention.

A computer program comprising instructions for executing the steps of the method described above may be designed based on an algorithm derived from the general dataflows depicted in FIGS. 3 and 4 and the present description.

Figure 5:
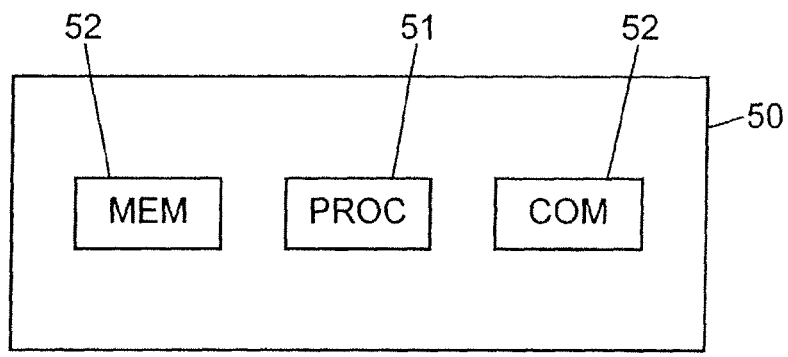
FIG. 5 is a schematic illustration of a device according to embodiments of the present invention.

Referring to FIG. 5, an e-Node B device (respectively a management unit of the network) 50 according to the present invention is described. The device comprises a processing unit 51 configured for implementing a method according to embodiments of the invention. To that purpose, the device comprises a memory unit 52. The memory unit may comprise several types of memory. For example, the memory unit may comprise a memory for storing processing data. The memory unit may also comprise a memory for storing a computer program according to embodiments of the invention. The device also comprises a communication unit 53 for performing communications over the network.

While the invention has been illustrated and described in details in the drawings and foregoing description, such illustration and description are to be considered illustrative and exemplary only, the invention being not restricted to the disclosed embodiments. Other variations to the disclosed embodiments can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method of configuration of an e-Node B device, in order to integrate the e-Node B device in a telecommunication network, comprising the following steps, performed by the e-Node B device:

entering a user equipment mode, wherein the e-Node B device behaves like a user equipment of the telecommunication network, establishing a communication link with a management entity of the telecommunication network, receiving configuration data for a self-configuration of the e-Node B in order to enter an operational mode from the management entity of the telecommunication network, through the communication link, self-configuring using the received data in order to provide a communication coverage area in the telecommunication network, and entering an operational state, wherein it offers to communication terminals of the telecommunication network a coverage area, wherein the establishment of the communication link comprises transmitting a data element indicating that the establishment of the communication originates from the e-Node B behaving as the user equipment, wherein the data element is an EPS attach type information element, and wherein the origin of the establishment of the communication link is indicated by a spare bit of the EPS attach type information element set to 1.

2. The method according to claim 1, wherein the self-configuration comprises the setting up of at least one communication interface of the e-Node B.

3. The method according to claim 2, wherein the communication interface is the X2/S1 interface.

4. The method according to claim 1, wherein the management entity is an e-Node B already deployed in the telecommunication network.

5. The method according to claim 1, wherein the management entity is a Mobility Management Entity of the telecommunication network.

6. The method according to claim 1, wherein the configuration data comprise a list of instructions to be performed in order to self-configure.

7. The method according to claim 1 further comprising the following steps performed by the management entity of the network:
receiving a communication link establishment request from the e-Node B,
identifying from a data element transmitted with said request that the request originates from the e-Node B in the user equipment mode,
preparing configuration data for the self-configuration of the e-Node B in order to enter the operational state, and
transmitting the configuration data to the e-Node B.

8. A computer program product comprising a non-transitory computer readable medium, having thereon a computer program comprising program instructions, the computer program being loadable into a data-processing unit to cause the data-processing unit to execute the steps of a method according to claim 1 when the computer program is run by the data-processing unit.

9. The e-Node B device comprising:
a control unit for managing a configuration of the e-Node B device in order to integrate the e-Node B device in the telecommunication network; and
a communication unit for communicating with the management entity of the telecommunication network;
wherein the control unit is configured for managing the configuration according to claim 1.

10. A management unit of the telecommunications network comprising:
a control unit for managing a configuration of the e-Node B device in order to integrate the e-Node B device in a telecommunication network; and
a communication unit for communicating with the management entity of the telecommunication network;
wherein the control unit is configured for managing the configuration according to claim 7.

11. A method of configuration of an e-Node B device, in order to integrate the e-Node B device in a telecommunication network, comprising the following steps, performed by the e-Node B device:

entering a user equipment mode, wherein the e-Node B device behaves like a user equipment of the telecommunication network, establishing a communication link with a management entity of the telecommunication network, receiving configuration data for a self-configuration of the e-Node B in order to enter an operational mode from the management entity of the telecommunication network, through the communication link, self-configuring using the received data in order to provide a communication coverage area in the telecommunication network, and entering an operational state, wherein it offers to communication terminals of the telecommunication network a coverage area, wherein the establishment of the communication link comprises transmitting a data element indicating that the establishment of the communication originates from the e-Node B behaving as the user equipment, wherein the data element is an EPS attach type information element, and wherein the origin of the establishment of the communication link is indicated by a spare bit of the EPS attach type information element set to 0.

12. The method according to claim 11, wherein the self-configuration comprises the setting up of at least one communication interface of the e-Node B.

13. The method according to claim 12, wherein the communication interface is the X2/S1 interface.

14. The method according to claim 11, wherein the management entity is an e-Node B already deployed in the telecommunication network.

15. The method according to claim 11, wherein the management entity is a Mobility Management Entity of the telecommunication network.

16. The method according to claim 11, wherein the configuration data comprise a list of instructions to be performed in order to self-configure.

17. The method according to claim 11 further comprising the following steps performed by the management entity of the network:
receiving a communication link establishment request from the e-Node B,
identifying from a data element transmitted with said request that the request originates from the e-Node B in the user equipment mode,
preparing configuration data for the self-configuration of the e-Node B in order to enter the operational state, and
transmitting the configuration data to the e-Node B.

18. A computer program product comprising a non-transitory computer readable medium, having thereon a computer program comprising program instructions, the computer program being loadable into a data-processing unit to cause the data-processing unit to execute the steps of a method according to claim 11 when the computer program is run by the data-processing unit.

19. The e-Node B device comprising:
a control unit for managing a configuration of the e-Node B device in order to integrate the e-Node B device in the telecommunication network; and
a communication unit for communicating with the management entity of the telecommunication network;
wherein the control unit is configured for managing the configuration according to claim 11.

20. A management unit of the telecommunications network comprising:
 a control unit for managing a configuration of the e-Node B device in order to integrate the e-Node B device in a telecommunication network; and
 a communication unit for communicating with the management entity of the telecommunication network;
 wherein the control unit is configured for managing the configuration according to claim 11.

* * * * *